US007894664B2

(12) United States Patent
Kerwin et al.

(10) Patent No.: US 7,894,664 B2
(45) Date of Patent: Feb. 22, 2011

(54) CONDITIONAL SHAPE MODEL FOR IMAGE PROCESSING

(75) Inventors: William S. Kerwin, Seattle, WA (US); Hunter R. Underhill, Seattle, WA (US)

(73) Assignee: University of Washington, Seattle, WA (US)

(*) Notice: Subject to any disclaimer, the term of this patent is extended or adjusted under 35 U.S.C. 154(b) by 1006 days.

(21) Appl. No.: 11/690,063

(22) Filed: Mar. 22, 2007

(65) Prior Publication Data

US 2007/0269086 A1 Nov. 22, 2007

Related U.S. Application Data

(60) Provisional application No. 60/784,602, filed on Mar. 22, 2006.

(51) Int. Cl.
*G06K 9/62* (2006.01)

(52) U.S. Cl. .................. 382/155; 382/159; 382/224

(58) Field of Classification Search ............. 382/155, 382/159, 224
See application file for complete search history.

(56) References Cited

U.S. PATENT DOCUMENTS

| 5,774,129 | A | | 6/1998 | Poggio |
| 6,137,909 | A | * | 10/2000 | Greineder et al. ........... 382/190 |
| 6,591,004 | B1 | | 7/2003 | VanEssen |
| 7,010,164 | B2 | | 3/2006 | Weese |
| 7,010,167 | B1 | * | 3/2006 | Ordowski et al. ........... 382/225 |
| 7,065,235 | B2 | | 6/2006 | Dewaele |
| 7,561,727 | B2 | * | 7/2009 | Conrad-Hansen et al. ... 382/128 |
| 7,747,054 | B2 | * | 6/2010 | Zhou et al. ................. 382/128 |

OTHER PUBLICATIONS

Cootes, T.F., et al., "Comparing Active Shape Models With Active Appearance Models," Proceedings of the British Machine Vision Conference, Nottingham, U.K., Sep. 13-16, 1999, pp. 173-182.
Cootes, T.F., et al., "The Use of Active Shape Models for Locating Structures in Medical Images," Image and Vision Computing 12(6):355-366, Jul. 1994.
Cootes, T.F., et al., "Active Shape Models—Their Training and Application," Computer Vision and Image Understanding 61(1):38-59, Jan. 1995.
Klim, S., et al., "More Active Shape Model," Proceedings of Image and Vision Computing New Zealand, Palmerston North, New Zealand, Nov. 26-28, 2003, pp. 396-401.

* cited by examiner

*Primary Examiner*—John B Strege
(74) *Attorney, Agent, or Firm*—Christensen O'Connor Johnson Kindness PLLC

(57) ABSTRACT

A conditional active shape model wherein a training set of images of objects in a class of objects to be identified, such as vascular cross-sections, is supplemented with training observations of at least one second characteristic of the object. A conditional mean shape of the objects is calculated, conditioned on the second characteristic, thereby reducing the size of the probable search space for the shape. A conditional covariance matrix of the shapes is calculated, conditioned on the second characteristic, and the eigenvectors of the conditional covariance matrix corresponding to largest eigenvalues are calculated. The conditional mean shape, and the eigenvalues and eigenvectors of the conditional covariance matrix are then used in an active shape model to identify the shapes of objects in subsequent images.

16 Claims, 7 Drawing Sheets

CONDITIONAL SHAPE MODEL FOR IMAGE PROCESSING

CROSS-REFERENCE TO RELATED APPLICATION

This application claims the benefit of U.S. Provisional Application No. 60/784,602, filed Mar. 22, 2006, the disclosure of which is hereby expressly incorporated by reference in its entirety, and priority from the filing date of which is hereby claimed under 35 U.S.C. §119.

STATEMENT OF GOVERNMENT LICENSE RIGHTS

This invention was made with government support under Grant Nos. T32-HL07828 and R44-HL070567, awarded by the National Institutes of Health. The Government has certain rights in the invention.

BACKGROUND

The Active Shape Model ("ASM") is an effective method for automated object boundary detection during image analysis. The ASM affords robust detection of the desired boundary by limiting the search space to high probability shapes. These attributes have enabled the successful utilization of the ASM across a variety of fields. Various techniques to extend the ASM to increase object recognition performance have also been proposed; however, the models may still fail in high noise environments or regions in which numerous structures present multiple confounding edges.

Object Boundary Detection

The general problem of object boundary detection in an image is well known in the art. The object is typically identified by finding a contour that minimizes an image "energy function." The energy function is typically lowest when the contour lies close to the edge of the desired object.

Active Shape Models

The general active shape model approach has been well described, and is known in the art. ASMs utilize statistical models of shapes to control the iterative deformation of the contour while minimizing the image energy function. The statistical model is derived from a set of training shapes. For example, see *The Use of Active Shape Models for Locating Structures in Medical Images*, Image and Vision Computing, Vol. 12, No. 6, July 1994, pp. 355-366, which is hereby incorporated by reference in its entirety (hereinafter, Cootes et al.).

Briefly, the shape of an object may be represented by a set of points. An mD-dimensional vector x describing m points in D-dimensional space describes the shape of an object within an image. These points may correspond to, for example, well-defined landmarks or regularly spaced points on the boundary of the object. It is further assumed that this shape vector is more compactly represented as $$x = x_0 + \sum_{n=1}^{N} b_n p_n,$$ (0)

where $x_0$ is the mean shape, $p_1, \ldots, p_N$ are orthonormal basis vectors and $b_1, \ldots, b_N$ are scalar weights. Typically, only N basis vectors are used where N is much smaller than m, leading to a more compact representation. Object identification then comes down to optimizing the set of weights to minimize an image energy function.

Estimating appropriate values for the mean shape, $x_0$, the basis vectors $p_n$ and the scalar weights $b_n$ is accomplished by examining the statistics of a training set of representative shapes (appropriately scaled and reoriented if desired). For example, a training set of images showing the carotid artery may be obtained wherein each image shows a cross-section of a carotid artery. On each image the location of the boundary of the carotid artery is carefully identified. An example of training set data for modeling the left ventricle of the heart is shown in Cootes et al.

Let $\mu_x$ and $K_x$ be the sample mean and covariance matrix of the training set. Then, the mean shape $x_0$ is defined to be equal to $\mu_x$, and the basis vectors $p_1, \ldots, p_N$ are taken to be the eigenvectors of $K_x$ that correspond to the N largest eigenvalues of $K_x$. Additionally, the allowable range of weights $b_n$ are typically taken to be $\pm a\sqrt{\lambda_n}$, where $\lambda_n$ is the corresponding eigenvalue and a is some scaling factor.

Any shape in the training set can be approximated using the sample mean and a weighted sum of the deviations obtained from the first N modes identified by the basis vectors corresponding to the largest eigenvalues. This also allows generation of new examples of shapes by varying the weights within suitable limits, so the new shapes will be similar to those in the training set. Therefore, suitable shapes for the object identified in new images (images not in the training set) can be obtained. This statistical model based on the training set of data can therefore be used to locate examples of objects in new images, using well-known procedures for minimizing the shape energy function. For example, estimating the location of points along the boundary of the shape, and using the model to move the points to best fit the image, as discussed in Cootes et al.

The original ASM formulation may be considered as composed of two components: 1) a shape model specification component, and 2) a new object detection component. A summary of the shape model specification is shown in FIG. 1, wherein the training shapes are provided 90 to the model, and the mean shape $\mu_x$ and covariance matrix $K_x$ are calculated 92, as discussed above. The training shapes are shapes obtained from images for the class of objects or shapes that the ASM is intended to identify. In the example below, the training shapes are shapes of the outline of the carotid artery at selected axial locations. The eigenvalues $\lambda_n$ of the covariance matrix, and the eigenvectors $p_1, \ldots, p_N$ corresponding to the largest N eigenvalues are then calculated 94. The mean shape $\mu_x$ 96 and eigenvalues $\lambda_n$ and eigenvectors $p_1, \ldots, p_N$ 98 are then used by the active shape model to identify the desired object shape in a non-training set image. The shape model specification component is then used using well-known techniques, in identifying instances of the object shape in images.

In taking this approach, there are three underlying assumptions of the shape model. First the shapes are random vectors. Second, the random vectors are drawn from a multivariate Gaussian probability density function. Third, in certain directions the regions of non-negligible probability are so thin that variation in those directions can be neglected. The shape model then takes advantage of the fact that any dependent multivariate Gaussian random variables can be transformed into a set of independent Gaussian random variables by identifying the principal axes of the Gaussian distribution. The eigenvectors of $K_x$ yield the principal axes of the distribution. Discarding those that correspond to the mD-N smallest eigenvalues eliminates the negligibly thin dimensions, leaving the eigenvectors $p_1, \ldots, p_N$. The weights $b_1, \ldots, b_N$ are the transformed, independent Gaussian random variables with mean 0 and variance $\lambda_n$. Assuming they lie within $\pm a\sqrt{\lambda_n}$ amounts to confining them to $\pm a$ standard deviations of their means.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A conditional active shape model is disclosed wherein the training set of image data is supplemented with a second characteristic from the training images, and the statistical characteristics of the shapes in the training set of image data are calculated conditioned on the second characteristic. The second characteristic may be, for example, a linear or area dimension of the shapes in the training set of images.

In particular, a conditional mean shape is calculated based on the training set and an observation of the second characteristic. The eigenvectors corresponding to the largest eigenvalues of the conditional covariance matrix are also calculated. These values are then used in a manner analogous to the prior art active shape model to efficiently identify appropriate shapes in new images that are not a part of the training set of images. In applying the disclosed procedure to identifying cross sections of the carotid artery in MRI images, for example, the procedure has been found to more efficiently and accurately identify the desired shapes, with much less risk of converging to an incorrect solution.

In a particular embodiment of the present method the shape of an object in an image, the object belonging to an object class, is determined. For example, the method may be used to identify the boundary of an artery in an MRI image. The method begins by obtaining a training set of images of objects in the object class, and identifying the shape of the objects in the training set of images. A second characteristic of the objects in the training set of images is then calculated. The second characteristic may be inherent in the images, such as a transverse width or characteristic area. Alternatively, the second characteristic may not be apparent from the image, for example the second characteristic may be a biometric attribute (or combination of attributes) of a person of whom the image is taken. In the artery example the second characteristic may be related to the age, blood pressure or other characteristic of the person.

A conditional mean shape of the objects conditioned on the second characteristic of the objects, and a conditional covariance matrix of the shape of the objects conditioned on the second characteristic of the objects are calculated. The eigenvalues and at least a subset of the corresponding eigenvectors of the conditional covariance matrix may then be determined using conventional techniques. One or more non-training set image(s) containing an image of an object in the object class is then obtained, including the second characteristic for the non-training set image(s). These are the images for which the boundary detection is desired. A conditional mean shape of the objects conditioned on the second characteristic of the objects in the training set of images and on the second characteristic value for the non-training set image is calculated and used to identify the shape of an object in the object class in the non-training set image.

In another embodiment the boundary of a blood vessel comprising the steps of: i) acquiring a series of cross-sectional images along a segment of the blood vessel; ii) identifying the vessel boundary in a first image in the series using object boundary detection methods; iii) generating an expected shape of an image of the blood vessel boundary in a subsequent image in the series based on the width of the artery boundary in the first image; iv) using the expected shape of the image the blood vessel boundary in the subsequent image as an additional constraint; iv) identifying the vessel boundary in the subsequent image using boundary detection methods; and v) repeating the steps of generating and expected shape of an image of a blood vessel boundary, and using the expected shape of the image of the blood vessel boundary, to identify the blood vessel boundary in additional subsequent images in the series.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

In FIG. 2A, the distribution is viewed from above, which is equivalent to ignoring y. In FIG. 2B, an oblique view shows the strong interdependence of the variables. Knowledge of specific values of y in FIG. 2C cuts the distribution at different levels. Knowledge of y transforms the region of high probability—represented by a circle at two standard deviations from the mean—in FIG. 2D to ellipses corresponding to particular values of y;

DETAILED DESCRIPTION

Figure 1:
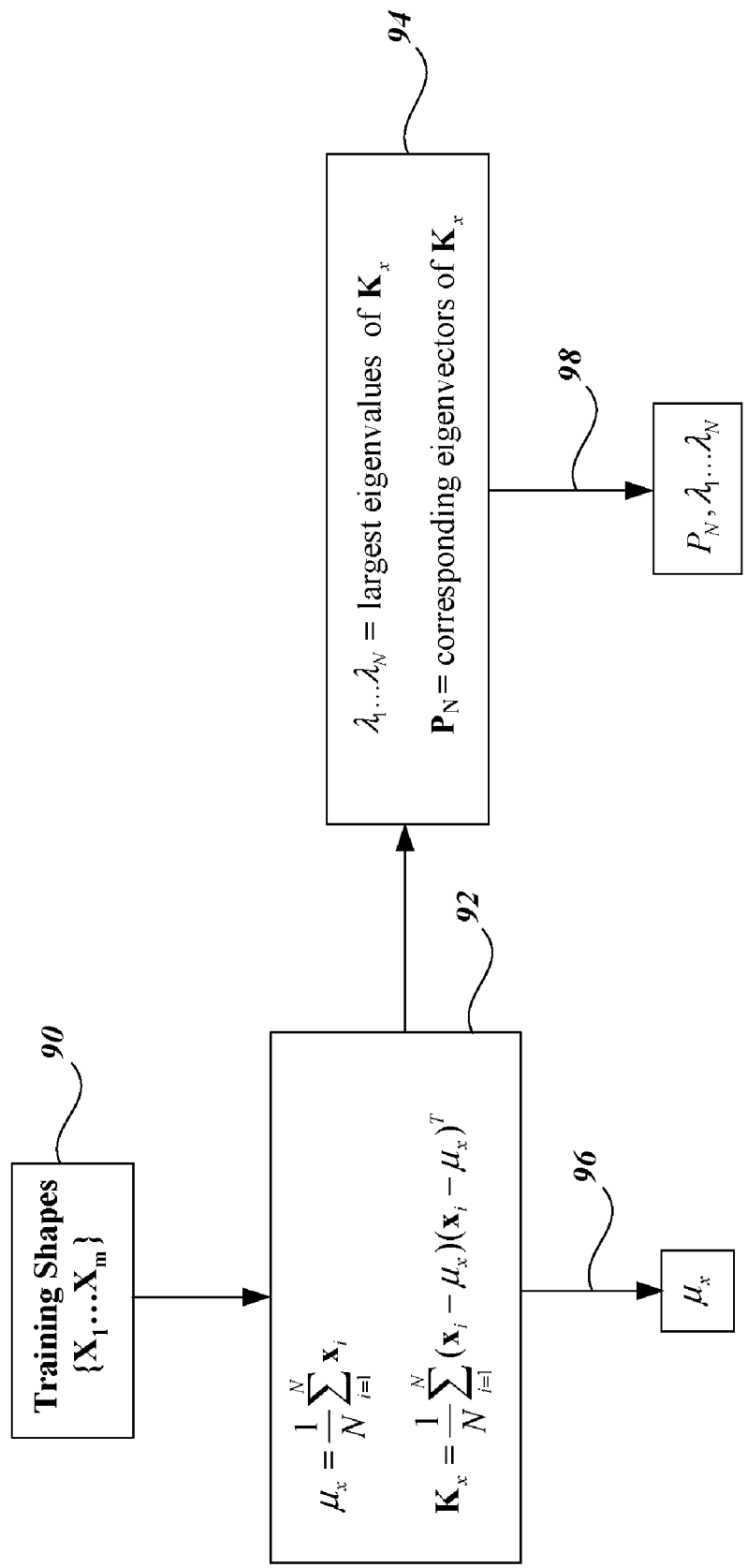
FIG. 1 is a flow chart showing the prior art method for calculating parameters for the active shape model.

We develop two extensions of the ASM theory that provide a more robust and efficient model. First, we propose a method for tuning the shape model based on observed inputs. Second, we use the formulation to sequentially identify a series of related shapes in serial images. Specifically, information observed in one image is used to tune the shape algorithm in the next image. Given the similarity to Markov random processes, in which the previous point determines the statistics at the current point in a series, we refer to this approach as a "Markov Shape Model."

In many situations involving detecting objects in images that are in a particular class of objects, prior information is observed that may prove helpful for reliably identifying the object boundary. To incorporate the previously observed data, a convenient framework is desirable that will allow the prior information to interact with the shape model, essentially tuning the model to account for the prior information. For example, in identifying the shape of objects, such as vessel wall boundaries, organ boundaries, tumors or the like in medical images taken of human persons (such as X-ray, computed tomography, ultrasound or magnetic resonance images), the prior information might include one or some combination of the subject's blood pressure, height, weight, age, gender, medical history or other biometric data of the imaged human person. Alternatively or in addition, as discussed below, the prior information may include data directly observable and/or measurable from the training images and from non-training images.

To develop this framework, let y be a vector containing the prior information and assume x and y are joint multivariate Gaussian random variables. Let $\mu_y$ be the mean of y and define a cross covariance matrix as follows:

$$K = E\left\{ \begin{bmatrix} (x-\mu_x) \\ (y-\mu_y) \end{bmatrix} \begin{bmatrix} (x-\mu_x)^T & (y-\mu_y)^T \end{bmatrix} \right\} = \begin{bmatrix} K_x & K_{xy} \\ K_{yx} & K_y \end{bmatrix}.$$

where E is the expectation operator.

Because y is observed, the conditional statistics of x given y are also of relevance. From standard probability theory, the conditional mean is:

$$\mu_{x|y} = \mu_x + K_{xy} K_y^{-1}(y - \mu_y) \quad (1)$$

and the conditional covariance matrix is:

$$K_{x|y} = K_x - K_{xy} K_y^{-1} K_{xy}^T. \quad (2)$$

Given y, we can thus build a shape model as in Equation (0), in which we define the mean shape:

$$x_0 = \mu_{x|y}$$

and $p_1, \ldots, p_N$ are eigenvectors corresponding to the N largest eigenvalues of the conditional covariance matrix $K_{x|y}$. The range of the weights in the shape model are determined by the eigenvalues of $K_{x|y}$.

The potential benefit of this approach is illustrated schematically in FIGS. 2A-2D, wherein we have assumed that the shape vector x is two-dimensional, y is one-dimensional, both are zero-mean, and the cross covariance matrix may be written:

$$K = \begin{bmatrix} 1 & 0 & 0.5 \\ 0 & 1 & 0.75 \\ 0.5 & 0.75 & 1 \end{bmatrix}.$$

That is:

$$K_x = \begin{bmatrix} 1 & 0 \\ 0 & 1 \end{bmatrix}; K_y = [1]; K_{xy} = \begin{bmatrix} 0.5 \\ 0.75 \end{bmatrix};$$

and $K_{yx} = K_{xy}^T = [\,0.5 \quad 0.75\,]$.

Figure 2A:
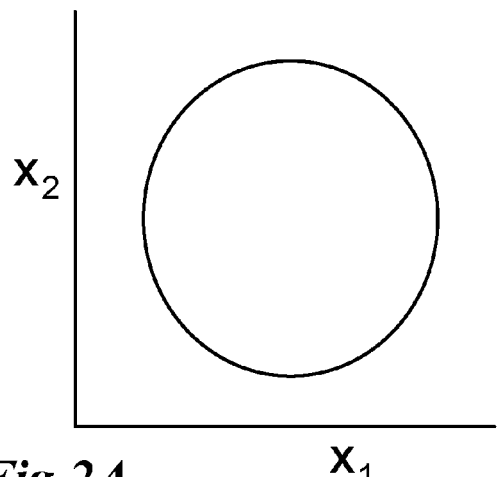
FIGS. 2A-2D show an isosurface of constant probability for a hypothetical density function.
Figure 2B:
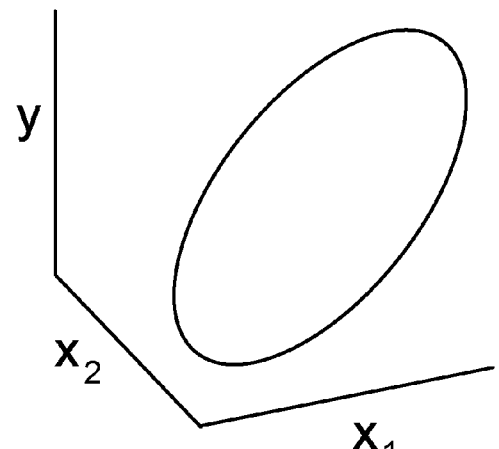
Figure 2C:
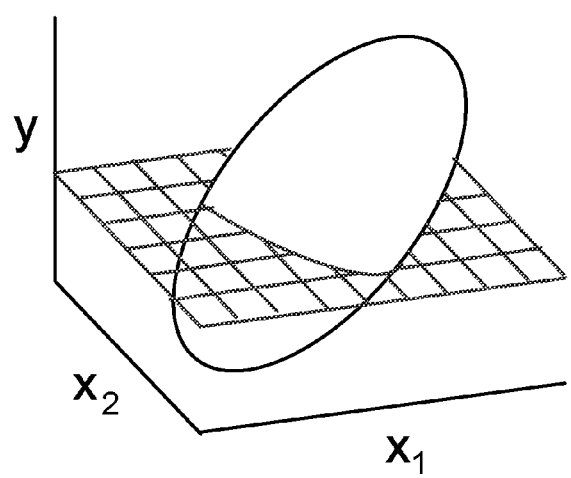
Figure 2D:
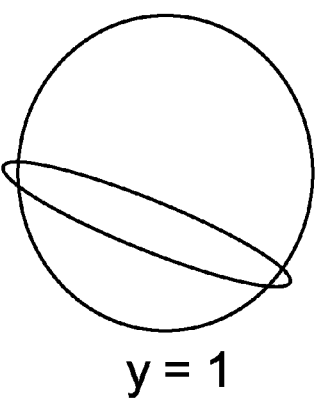

Without knowledge of y, the components of x (i.e., $x_1$ and $x_2$) are independent zero-mean Gaussian random variables with variance equal to 1. Thus, the high-probability region for these values is a circular region centered at the origin, as shown in FIG. 2A. However, the high-probability region of the joint distribution of x and y together occupies a more cigar shaped region, tilted relative to the $x_1$-$x_2$ plane, as indicated in FIG. 2B. Observation of specific values of y amounts to cutting the joint distribution with a plane at that value of y, see FIG. 2C. The statistics of the probability distribution within the cut plane are given by equations (1) and (2). Knowledge of y thus transfers the region of high probability for $x_1$ and $x_2$ from a circular region at the origin to a much smaller elliptical region offset from the origin, see FIG. 2D. By focusing the search for the object of interest on the smaller region, the search time is potentially reduced, and convergence to an incorrect local minimum is much less probable. Furthermore, knowledge of y has elicited a strong interdependence of $x_1$ and $x_2$, represented by the tilt in the ellipse.

To generate such a conditional ASM, the cross covariance matrix K is computed and used to derive $K_{x|y}$ using equation (2). An important feature of this equation is that $K_{x|y}$ is determined from the training set of data, and therefore does not depend on the actual value of y observed. Therefore, the eigenvectors and eigenvalues of the covariance matrix are computed just once. The value of $\mu_{x|y}$, however, does depend on the observed value, but can be computed from the simple linear Equation (1).

As discussed above with reference to FIG. 1, the original ASM formulation includes a shape model specification component and an object identification component. The present conditional ASM addresses the model specification component. By considering additional observed parameters, the conditional ASM creates a mean shape, modes of variation (eigenshapes), and range of variation (eigenvalues) that are tuned to a specific object recognition task.

Figure 3:
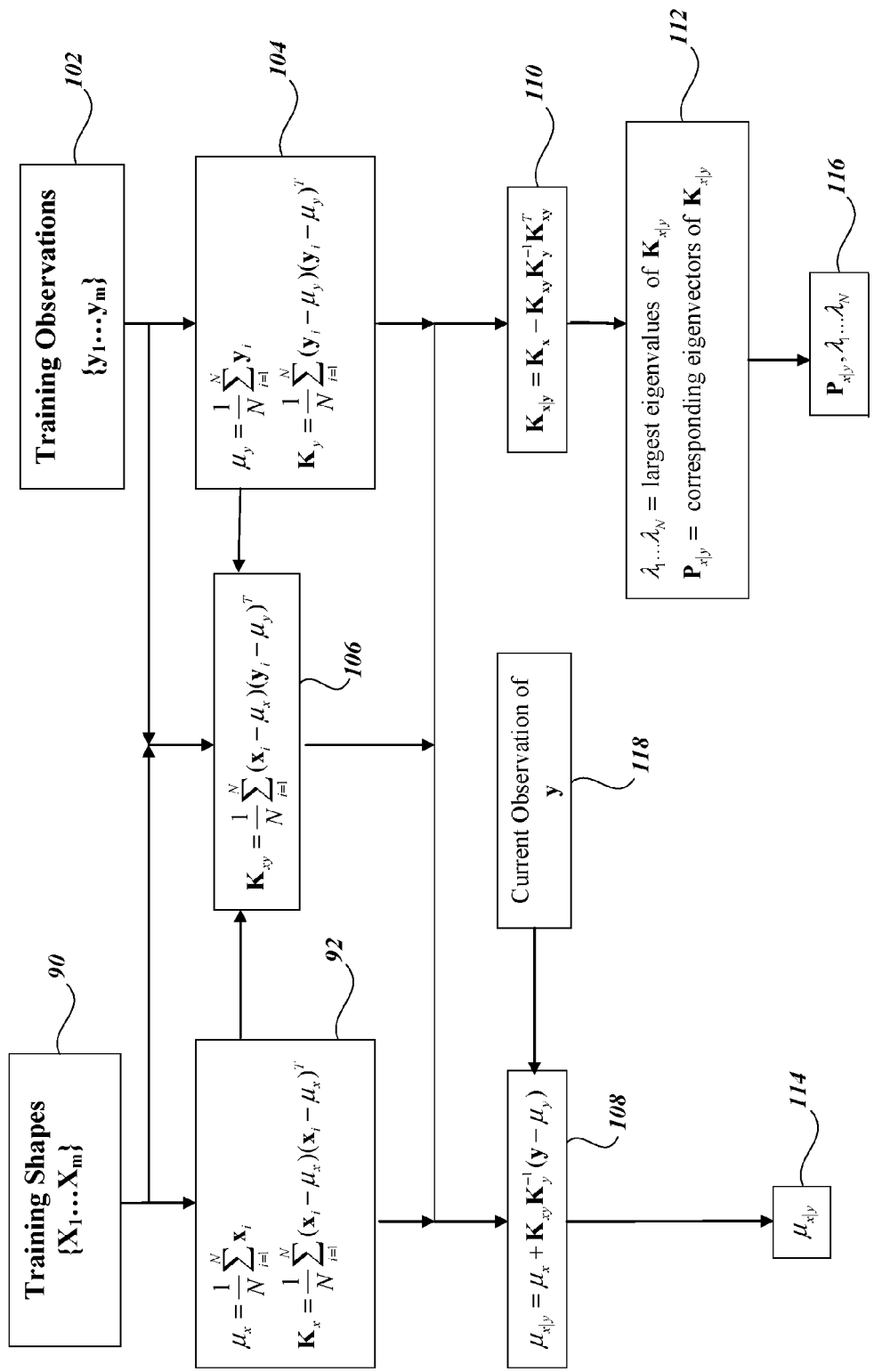
FIG. 3 is a flow chart showing the present method for calculating parameters for the conditional active shape model of the present invention.

A flow chart showing steps used to compute the shape specification for the conditional ASM are depicted in FIG. 3, which may be compared with FIG. 1 to better understand the present method. In the present method, training shapes 90, representative shapes of the class of object to be identified, are similarly employed to calculate the means shape $\mu_x$ and covariance matrix $K_x$ 92. The training shapes may be appropriately reoriented and scaled. Training observations $y_i$ of an additional parameter of the shape are also identified 102, and the mean and covariance matrix for $y_i$ are calculated 104. The training observations are observations of a parameter of the images from which the training shapes are obtained. For example, one or more widths, the cross-sectional area, position, or other dimensional aspect of the training shape may be measured and used as the training observation.

A cross covariance matrix $K_{xy}$ is then calculated 106. The conditional mean shape $\mu_{x|y}$ is calculated 108 using a corresponding observation of y 118, and the conditional covariance matrix $K_{x|y}$ is calculated 110. The eigenvalues $\lambda_i$ and eigenvectors $P_{x|y}$ are then calculated from the conditional covariance matrix $K_{x|y}$ 112, rather than the covariance matrix. In the conditional ASM disclosed herein, these new conditional values for the mean shape $\mu_{x|y}$, eigenvalues $\lambda_i$ and eigenvectors $P_{x|y}$ 114, 116 are used to identify the shape in new images, employing existing well-known ASM methods for identifying the shape of the object in new images.

It is contemplated that a data set may then be generated and stored, for example on a computer data storage medium, that shows the shape of the object, which may for example be overlayed on the new images, and/or may be displayed on a monitor or the like. The shape data may also be output for further automated processing, for example to automatically generate reports related to the shape data, or to flag data for further investigation.

Markov Shape Model

An intriguing application of the conditional ASM arises in serial images of the same object. The image series may represent a time sequence or successive cross sections of a three dimensional object. One possibility for dealing with such a situation is to increase the dimensionality of the shape model by one and perform a single global detection of the object in all images simultaneously. However, the global shape model is likely to require a higher value of N and thus require considerably more effort to optimize. The global shape model is also unwieldy in the case of serial images of varying lengths or on-line object recognition in time series images. On the other hand, applying a single ASM to each image independently fails to recognize the likely interdependence of the images.

The approach in the Markov Shape Model ("MSM") is to assume that the interdependence between images is limited to one or a small number of adjacent images and that the random process is stationary. Specific features of the shapes in these adjacent images, such as their areas, are used to tune the conditional shape model. If we assume that $y_i$ is the set of relevant information in frame i corresponding to shape $x_i$, then we build a shape model based on $$\mu_{x|y_{i-1},\ldots,y_{i-l}}$$

and $$K_{x|y_{i-1},\ldots,y_{i-l}},$$

where l defines the span of the interactions between images.

The MSM is generated from a training set of data in the same fashion as the conditional ASM described above. Then, in practice, the MSM assumes that the object has been correctly identified in the previous l images in the series. Observations from these images are used to derive the conditional ASM for the next image in the series. In this fashion, the MSM progresses iteratively through the entire series, identifying the object in each successive image.

Application to Vessel Outer-Wall Boundary Detection

Application of the MSM seems particularly suited for object detection in the type of sequential imaging offered by magnetic resonance imaging ("MRI"), although it is contemplated by the present invention that alternative imaging modalities may be used, and may be preferable in different applications, including without limitation, conventional X-rays, computed tomography, functional MRI, ultrasound and/or positron emission tomography.

The identification and tracking of an anatomic boundary across an image series is desirable in a variety of fields, including oncology and the vascular specialty. For illustrative purposes, the application of the invention to vascular imaging and in particular to carotid artery imaging will be described. However, the present method may be used in a wide variety of image identification applications in the medical field, and outside of the medical field, where training sets of data are obtainable.

The lumen and outer-wall borders of a vessel are of particular importance since patient atherosclerotic disease status is assessed by changes in these boundaries as the wall remodels itself in response to variation in atheroma burden. In high-resolution carotid MRI, development of axial, black-blood acquisition techniques has enabled the visualization of the in vivo arterial wall. Although previous techniques have been proposed for the identification of the lumen boundary, detection of the outer-wall boundary is a considerably more difficult task due to 1) indistinct boundaries, and 2) adjacent anatomic structures with similar edge profiles. Additionally, the carotid artery has a rapidly changing morphology due to 1) a 2 mm out-of-plane imaging resolution, 2) the division of the common carotid artery into the internal and external carotid arteries, and/or 3) presence of plaque.

As a consequence, applying luminal information to detect the outer-wall boundary in a diseased artery is of limited use, and the large search space of an ASM trained to detect both proximal and distal segments would be susceptible to being trapped in a local minimum. Therefore, we trained and applied a MSM for outer-wall boundary identification of the common carotid artery in axial, T1-weighted MR images.

The Training Set

From a database, 11 carotid arteries were selected that represented a broad range of the possible outer-wall morphology. Since the proximal sections of the carotid were fairly uniform, slice selection was limited to within 1 cm of the bifurcation—the region where the greatest variability occurs. For each selected carotid, points along the outer-wall boundary were manually identified via graphical user interface on four contiguous axial T1-weighted slices including the bifurcation. A B-spline using 12 knots was used to best fit a curve to these points. The two points, $c_{i1}$ and $c_{i2}$, on the curve separated by the greatest Euclidean distance were used to identify the major axis. The shape was then rotated about the midpoint, $m_i$, of $c_{i1}$ and $c_{i2}$ to align the major axis with the horizontal. Points of intersection between the curve and radial lines extending from $m_i$ every 22.5 degrees were used to sample the shape. As a result, each training shape was represented by a 32-element vector $x_i$ as in $$x_i = (x_{i0}, y_{i0}, x_{i1}, y_{i1}, \ldots, x_{in-1}, y_{in-1})^T.$$

Figure 5:
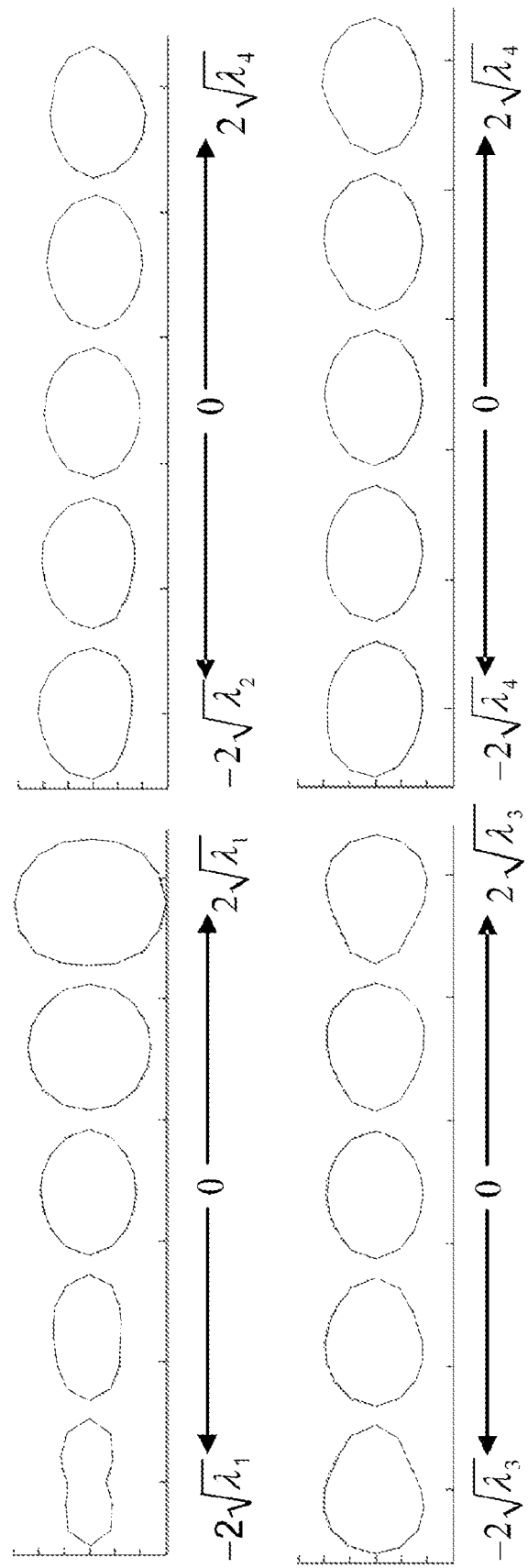
FIG. 5 shows the deforming influence of each of the four main eigenvectors on $x_0$.

After all shapes were represented in vector notation, each shape was scaled to match the maximum of the major axis lengths. Using the approach described by Cootes et al., a point distribution model ("PDM") of all shapes was then generated independent of slice level. Table 1 shows the most significant eigenvalues from the derived covariance matrix for the ASM. The third column of Table 1 illustrates that 99% of the variation in the training set is captured by adding a linear combination of the first four $p_n$'s to $x_0$. FIG. 5 demonstrates the influence of each $p_n$ on the mean shape as it is ranged across $\pm 2\sqrt{\lambda_n}$ for n=1,2,3,4. Notice that shapes representing both proximal and distal segments of the artery are captured by the ASM.

TABLE 1

Eigenvalues of the Covariance Matrix for the ASM and two different MSMs.

| Eigenvalue | ASM Value | ASM | MSM$_1$ Value | MSM$_1$ $\frac{\lambda_i}{\lambda_T} \times 100\%$ | MSM$_2$ Value | MSM$_2$ $\frac{\lambda_i}{\lambda_T} \times 100\%$ |
|---|---|---|---|---|---|---|
| $\lambda_1$ | 234 | 89% | 50 | 63% | 42 | 73% |
| $\lambda_2$ | 14 | 5% | 13 | 17% | 8.5 | 15% |
| $\lambda_3$ | 11 | 4% | 11 | 14% | 3.5 | 6% |
| $\lambda_4$ | 2 | 1% | 2 | 2% | 1.5 | 3% |

Outer-Wall Boundary Markov Shape Model

Figure 4:
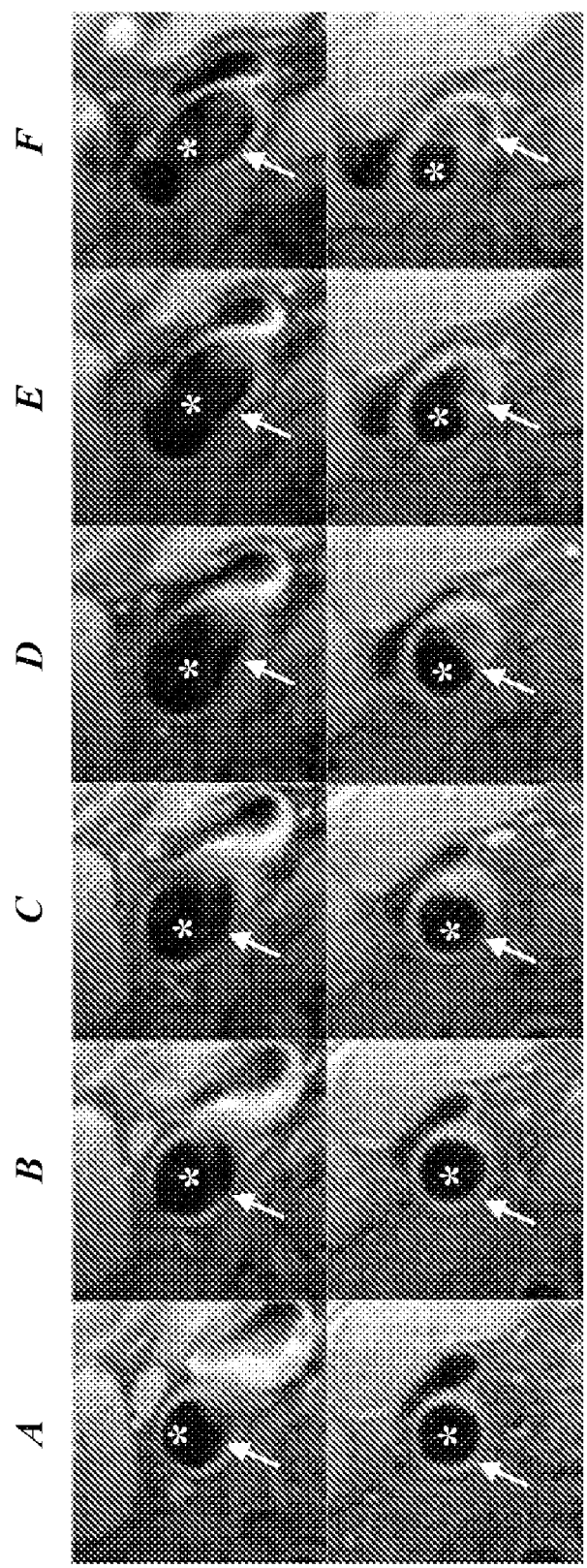
FIG. 4 shows examples of images suitable for use with the present method, comprising axial images from both non-diseased (top) and diseased (bottom) common carotid arteries near the bifurcation. The lumen is marked with an asterisk. The outer-wall boundary (arrows) changes from a circular proximal common carotid (Column A) to an elongated bifurcation (Column F). Additionally, notice in the diseased artery that the luminal boundary can be very distant from the outer-wall boundary.
Figure 6A:
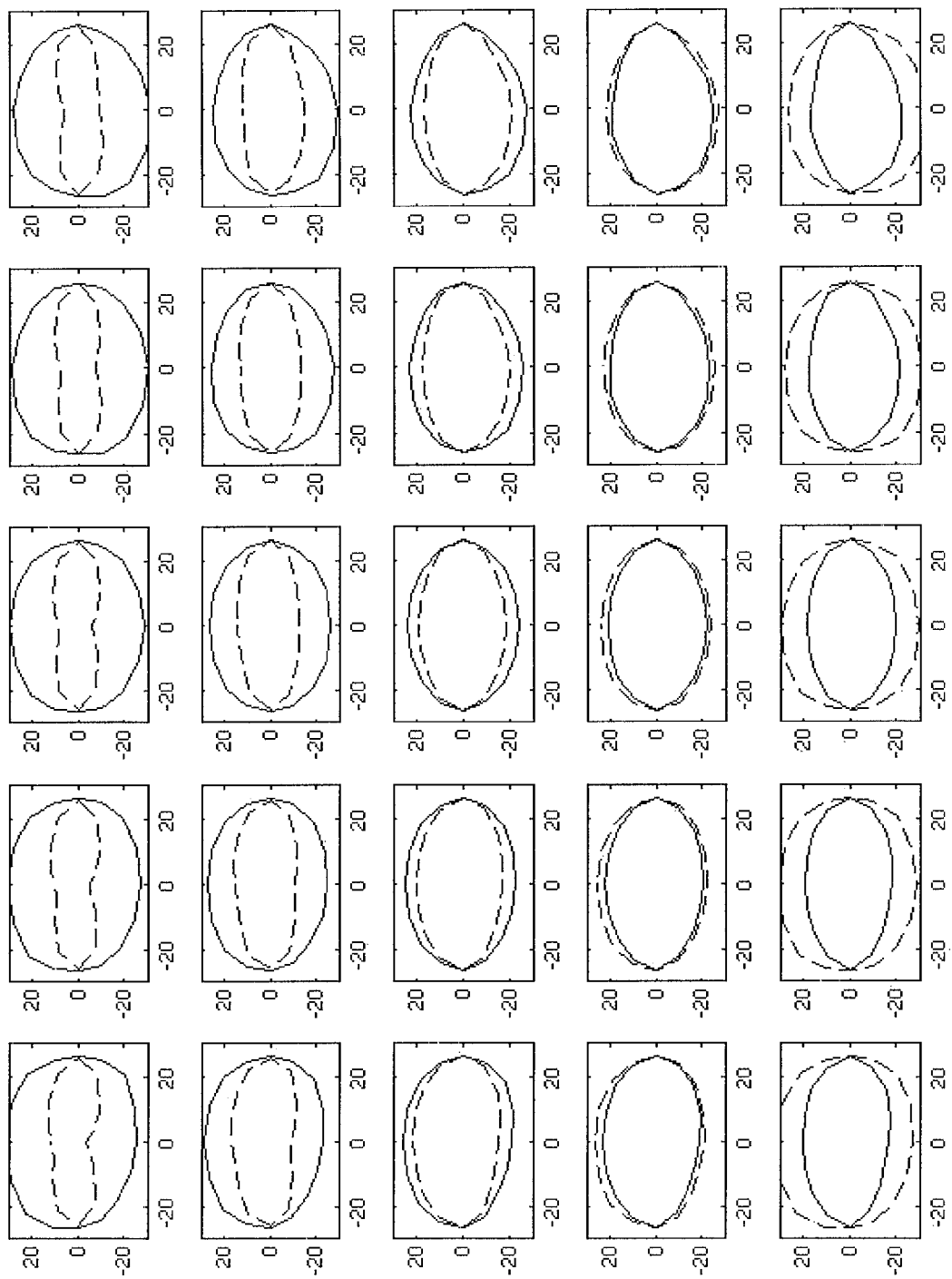
FIGS. 6A and 6B show comparisons of contours calculating using the original ASM (dashed line) is passed through a combination of its first two eigenvectors and its mean shape. The dashed box represents the mean shape without any eigenvector input. The Markov Shape Model ("MSM") (solid line) for the proximal slice (FIG. 6A) and the bifurcation slice (FIG. 6B) are also passed through a combination of their respective first two eigenvectors. Notice the significant change in the mean shape and the range of shapes of the MSM when comparing FIG. 6A to FIG. 6B.

To generate a MSM from the same training set of 11 arteries, a one-dimensional vector y with l=1 was defined by the width of the shape along a line perpendicular to the major axis at its midpoint, m, from the adjacent more proximal slice. After training the MSM, we applied it to a proximal shape (FIG. 4A—top) and distal shape (FIG. 4E—top) to identify the effect of the prior information or supplemental information y on $x_0$ and $p_1, \ldots, p_N$. Table 1, in columns labeled $MSM_1$, shows the magnitude of the most significant eigenvalues obtained from the MSM covariance matrix. Overall, there was a 55% reduction in the search space (search space is proportional to the square root of the product of the eigenvalues). FIG. 6A demonstrates the influence of the first two parameters ($b_1$ and $b_2$) on the new mean shape. For comparison, the original PDM is deformed over a corresponding range of its associated eigenvectors.

Figure 6B:
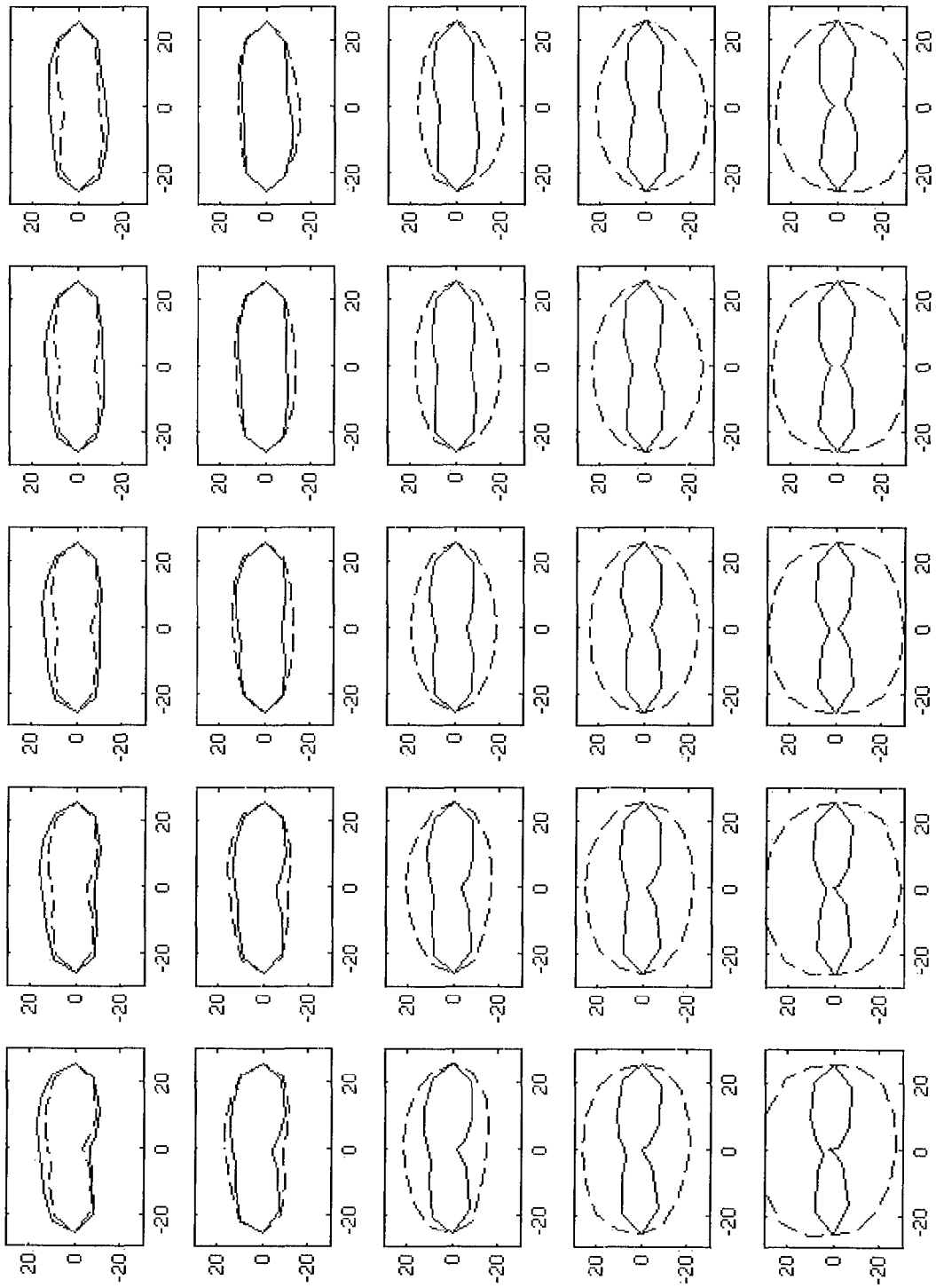

Notice the restriction of the predicted shape away from morphologies that are more likely to resemble the bifurcation. Similarly, when a more distal section is entered, the predicted shape is steered away from shapes resembling the proximal segment (FIG. 6B). As noted previously, the $p_n$'s and the $b_n$'s remain unchanged, but the mean shape changes considerably. Observe that the outer wall boundary of the adjacent more distal slice for both the proximal (FIG. 4B—top) and distal (FIG. 4F—top) shapes that MSM is trying to predict can be identified within the respective search spaces (FIGS. 6A and 6B, solid lines) of the MSM.

By increasing the amount of observed information in y, the search space is further reduced. Whereas previously only a single width measurement located at the midpoint of the major axis was entered, another MSM was created ($MSM_2$) based on a five-dimensional vector y containing five evenly spaced width measurements along the major axis. The overall 84% reduction in search space for the same shapes is delineated in Table 1, columns labeled $MSM_2$. Changes to the mean shapes and search space are very similar to that depicted in FIGS. 6A and 6B.

Results

The outer-wall boundary MSM was tested on 16 axial, T1-weighted images from a total of 16 different diseased and non-diseased carotid arteries. None of the arteries were included in the original training set. For each image, y was constructed from the manually identified outer-wall boundary on the proximal, more adjacent image to form two separate models ($MSM_1$ and $MSM_2$) based on the amount of input ($y_1$=1-element vector, $y_2$=5-element vector) as previously described. The subsequent mean shapes for the ASM, $MSM_1$ and $MSM_2$ were then scaled and rotated to the same size and orientation of the input shape to create $x_S$. Each model then entered an iterative loop:

Repeat
1. Locally, rotate and shift $x_S$ to maximize edge energy.
2. For each point, identify the strongest local edge along a line normal to the curve at that point.
3. Deform the shape within the constraints ($\pm 2\sqrt{\lambda_n}$ for n=1,2,3,4) of the respective model to minimize the distance to the desired point to form a new $x_S$.

Until the process converges.

For each model, the number of iterative steps until convergence was recorded. A radiologist, blinded to method, determined if the boundary was correctly identified.

The ASM correctly identified 7 (43.75%) boundaries. $MSM_1$ and $MSM_2$ correctly identified 15 (93.75%) and 14 (87.5%) boundaries, respectively.

Of the 7 cases correctly identified by the ASM, the average number of iterations was 9.7±1.4 (SE). In those same 7 cases, the number of iterations required by $MSM_1$ and $MSM_2$ were 5.9±0.9 (SE) and 5.4±0.6 (SE), respectively. In a paired t-test, $MSM_1$ and $MSM_2$ required significantly less iteration to converge compared to the ASM (p<0.01, p<0.02). Although not statistically significant, $MSM_1$ identified one more boundary correctly than $MSM_2$; and of the 14 cases where both $MSM_1$ and $MSM_2$ achieved correct detection, $MSM_1$ required fewer iterations; 5.9±0.6 (SE) compared to 7.4±1.3 (SE), (p=0.10).

Discussion

The variation of the carotid artery combined with the obstacles inherent to medical imaging pose a formidable challenge for automated boundary detection. The failure of the ASM in over half of the cases is a consequence of the mean shape being distant from the desired boundary and the model deforming towards confounding edges. Creating a MSM from the ASM by the inclusion of observational data from an adjacent image, however, placed the adjusted MSM mean shape closer to the desired boundary, thus enabling more accurate convergence. In cases where the mean shape of the ASM was near the desired shape, the ASM was successful but converged slower than the MSM. The more rapid convergence may be a result of 1) the reduced search space of the MSM eliminates many of the shapes that the ASM may have to consider and/or 2) the initial shape is more similar to the desired boundary. In the case where $MSM_1$ failed, a piece of calcification adjacent to the outer-wall boundary caused an obscure border leading to a reasonable, but inaccurate solution.

Although the differences between $MSM_1$ and $MSM_2$ did not obtain statistical significance, the trend is interesting. The improved accuracy and decreased computation afforded by $MSM_1$ suggests that $MSM_2$ may be too restricted in its search space and therefore, unable to handle variations when there is a large difference from the predicted shape. Although we elected to use width information as a descriptor, any extractable feature (appearance, area, etc.) or combination of features as indicated by the object being sought may be used to create y and further optimize the search. However, like the ASM, the MSM is bounded by the scope of the training set. To maximize utility, shapes representing the full spectrum of possibilities need to be carefully selected. Additionally, the type and quantity of descriptive predictors needs to be well defined to balance a decrease in search space with preservation of some degree of flexibility.

Although the proposed MSM was implemented on serial medical images from a single time point, the MSM may have other applications. For example, the observed information may be temporally derived. If an object is imaged at two separate time points, the MSM may be used to predict how the shape will deform at the second time point based upon 1) amount of time between images, and/or 2) events occurring between time points. Alternatively, the MSM may be used to track a moving object in an image series, where it may be beneficial to make l>1. An advantage the proposed technique has over other techniques that have incorporated space and time information into the ASM, is that our method does not require simultaneous segmentation of the entire series. Instead, each image is segmented sequentially, enabling interventional corrections by the user at each boundary detection to optimize identification in subsequent images. Additionally, the technique affords the possibility of real-time object tracking since boundary identification is not dependent on future information.

Of course, the detection of the first shape in the series would not have the benefit of a reduced search space since there would be no prior observational data. However, strategies that exist to simplify the search are: 1) manual identification, and 2) pre-defined restrictions on the search space. Using our example of the carotid artery, the outer-wall boundary near the bifurcation is highly variable compared to the proximal segment that is more concentric. By beginning with a proximal slice, the search space can be restricted to only relatively circular shapes and the first shape can be readily identified. The MSM can then be applied to each successive slice. A similar approach can be extended to other applications by selecting the first object in the series to have low variability or a characteristic appearance.

In this example, the boundary of the carotid artery may be identified from the series of cross-sectional images along a segment of the carotid artery by identifying the carotid artery in a first image in the series using object boundary detection methods. Note that the boundary detection methods may be conventional methods, and may be automated or manual boundary detection. An expected shape of the carotid artery in the next image may then be generated using the information from the first image as a constraint. It will be appreciated by the artisan that information about the adjacent image will greatly narrow the range of likely shapes in the subsequent image. A particular aspect of the first image may be used, such as the width of the artery in the first image. Boundary detection methods may be used, incorporating the information from the first image, to detect/generate the shape of carotid artery in the second image using boundary detection methods. This process can be repeated for subsequent images, using information from the prior image(s) as a constraint on the artery shape in subsequent images.

In conclusion, the MSM may be beneficial in medical imaging where serial imaging is commonplace and there is an increasing demand for automated and semi-automated tools. Additionally, the MSM may be an effective tool for object boundary detection in any imaging technique where serial images in time or space are produced.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of identifying the shape of an object in an image, the object belonging to an object class, the method comprising the steps:

obtaining a training set of images, each image depicting an object in the object class;

identifying the shape of the objects in the training set of images;

calculating a mean shape of the objects in the training set of images;

calculating a covariance matrix of the shapes of the objects in the training set of images;

identifying at least one second characteristic of the objects in the training set of images;

calculating a mean for the second characteristic of objects in the training set of images;

calculating a covariance matrix of the second characteristic of the objects in the training set of images;

calculating a cross covariance matrix relating the shape of the objects to the second characteristic of the objects in the training set of images;

calculating a conditional mean shape of the objects conditioned on the second characteristic of the objects in the training set of images;

calculating a conditional covariance matrix of the shape of the objects conditioned on the second characteristic of the objects in the training set of images;

calculating the eigenvalues and at least a subset of the corresponding eigenvectors of the conditional covariance matrix;

obtaining a non-training set image containing an image of an object in the object class and including a value for the second characteristic for the non-training set image;

calculating a conditional mean shape of the objects conditioned on the second characteristic of the objects in the training set of images and on the second characteristic value for the non-training set image;

using the conditional mean shape and corresponding eigenvectors of the conditional covariance matrix to identify the shape of an object in the object class in the non-training set image, wherein the identified shape of the object is generated on a computer and stored on a computer data storage medium.

2. The method of claim 1, wherein the object class comprises medical images.

3. The method of claim 2, wherein the medical images comprise cross sectional images of a carotid artery.

4. The method of claim 2, wherein the second characteristic of the objects in the training set of images comprises a dimension of the objects.

5. The method of claim 2, wherein the training set of images comprises a series of images depicting sequentially a temporal or spatial extent of the object from the class of objects.

6. The method of claim 3, wherein the training set of images comprises a series of images of the carotid artery depicting sequentially images taken along a length of the carotid artery.

7. The method of claim 3, wherein the images are aligned along an axis defined by two points on the object separated by the greatest Euclidian distance, and the images are scaled to all have the same Euclidian distance along the defined axis.

8. The method of claim 2, wherein the objects in the medical images are taken from human persons, and the second characteristic of the objects comprises at least one of the blood pressure, height, weight, age and gender of the imaged human person.

9. A method of identifying the shape of an object in an image, the object belonging to an object class, the method comprising the steps:

obtaining a training set of images, each image depicting an object in the object class;

identifying the shape of the objects in the training set of images;

identifying at least one second characteristic of the objects in the training set of images;

calculating a conditional mean shape of the objects conditioned on the second characteristic of the objects in the training set of images;

calculating a conditional covariance matrix of the shape of the objects conditioned on the second characteristic of the objects in the training set of images;

calculating the eigenvalues and at least a subset of the corresponding eigenvectors of the conditional covariance matrix;

obtaining a non-training set image containing an image of an object in the object class and including a value for the second characteristic for the non-training set image;

calculating a conditional mean shape of the objects conditioned on the second characteristic of the objects in the training set of images and on the second characteristic value for the non-training set image;

using the conditional mean shape and corresponding eigenvectors of the conditional covariance matrix to identify the shape of an object in the object class in the non-training set image;

wherein the identified shape of the object is generated on a computer and stored on a computer data storage medium.

10. The method of claim 9, wherein the object class comprises medical images.

11. The method of claim 10, wherein the medical images comprise cross sectional images of a carotid artery.

12. The method of claim 10, wherein the second characteristic of the objects in the training set of images comprises a dimension of the objects.

13. The method of claim 10, wherein the training set of images comprises a plurality of series of images depicting sequentially a temporal or spatial extent of the object from the class of objects.

14. The method of claim 12, wherein the training set of images comprises a plurality of series of images of the carotid artery depicting sequentially images taken along a length of the carotid artery.

15. The method of claim 12, wherein the images are aligned along an axis defined by two points on the object separated by the greatest Euclidian distance, and the images are scaled to all have the same Euclidian distance along the defined axis.

16. The method of claim 10, wherein the objects in the medical images are taken from human persons, and the second characteristic of the objects comprises at least one of the blood pressure, height, weight, age and gender of the imaged human person.

* * * * *